US008077081B2

(12) United States Patent
Bateman et al.

(10) Patent No.: US 8,077,081 B2
(45) Date of Patent: Dec. 13, 2011

(54) GROUND COLLISION INSTRUMENT FOR AIRCRAFT AND MARINE VEHICLES

(75) Inventors: C. Don Bateman, Bellevue, WA (US); John J. Poe, Woodinville, WA (US); John H. Glover, Yarrow Point, WA (US)

(73) Assignee: Honeywell International Inc., Morristown, NJ (US)

( * ) Notice: Subject to any disclaimer, the term of this patent is extended or adjusted under 35 U.S.C. 154(b) by 141 days.

(21) Appl. No.: 12/351,353

(22) Filed: Jan. 9, 2009

(65) Prior Publication Data
US 2009/0219189 A1    Sep. 3, 2009

Related U.S. Application Data

(60) Provisional application No. 61/024,495, filed on Jan. 29, 2008.

(51) Int. Cl.
G01S 13/04 (2006.01)
G01S 13/95 (2006.01)
G01S 13/00 (2006.01)
G01S 13/93 (2006.01)

(52) U.S. Cl. ........ 342/195; 701/200; 701/207; 701/213; 701/300; 701/301; 342/23; 342/26 R; 342/26 B; 342/26 C; 342/26 D; 342/27; 342/29; 342/41; 342/70; 342/82; 342/175; 342/176; 342/190; 342/191

(58) Field of Classification Search .................... 342/21, 342/22, 26 R–26 D, 27, 28, 29–41, 59, 70–72, 342/82–103, 159, 175, 195, 118, 128, 134, 342/135, 23, 176, 179, 190, 191; 701/1, 701/3, 21, 200, 207, 213–216, 300, 301, 701/120–122; 345/418, 419; 340/500, 540, 340/541, 552–557, 933, 945, 961

See application file for complete search history.

(56) References Cited

U.S. PATENT DOCUMENTS 3,727,223 A * 4/1973 O'Meara ......................... 342/82
(Continued)

FOREIGN PATENT DOCUMENTS

EP    1072901 A1    1/2001

OTHER PUBLICATIONS

Sy Levine, The Remote Aircraft Flight Recorder and Advisory Telemetry System-RAFT (patent pending) and its Application to Unifying the Total Digital Aavionics System, O-7803-5086-3/98/, 10 Pages, Safety Intelligence Systems (SISTMS), Topanga, California, Oct. 31, 1998.

(Continued)

Primary Examiner — Bernarr Gregory
(74) Attorney, Agent, or Firm — Lowes Graham Jones PLLC (57) ABSTRACT

Radar return processing systems and methods are operable to process radar information when an installation vehicle is operating in proximity to a surface area of interest. An exemplary embodiment reduces energy of an output pulse emitted from a radar system; receives a plurality of radar returns from a plurality of objects that reflect the reduced energy output pulses emitted from the radar system; determines a surface area of interest based upon at least a current location of the installation vehicle; and filters the radar returns generated by objects that are located outside of the surface area of interest. Optionally, some systems and methods may reduce a sweep range of an antenna from which the reduced energy output pulses are emitted.

20 Claims, 5 Drawing Sheets

U.S. PATENT DOCUMENTS

| | | | |
|---|---|---|---|
| 3,795,910 A * | 3/1974 | Robinson, Jr. | 342/82 |
| 3,872,474 A * | 3/1975 | Levine | 342/36 |
| 4,179,695 A * | 12/1979 | Levine et al. | 342/37 |
| 4,418,349 A * | 11/1983 | Hofgen et al. | 342/37 |
| 4,516,125 A * | 5/1985 | Schwab et al. | 342/36 |
| 4,845,629 A * | 7/1989 | Murga | 701/120 |
| 5,189,425 A * | 2/1993 | Dabbs | 342/36 |
| 5,287,111 A * | 2/1994 | Shpater | 342/28 |
| 5,309,160 A * | 5/1994 | Powell et al. | 342/128 |
| 5,334,982 A * | 8/1994 | Owen | 342/36 |
| 5,351,077 A * | 9/1994 | Lee et al. | 342/35 |
| 5,374,932 A * | 12/1994 | Wyschogrod et al. | 342/36 |
| 5,375,058 A * | 12/1994 | Bass | 701/120 |
| 5,400,031 A * | 3/1995 | Fitts | 342/36 |
| 5,432,895 A * | 7/1995 | Myers | 345/419 |
| 5,448,243 A * | 9/1995 | Bethke et al. | 342/59 |
| 5,469,371 A * | 11/1995 | Bass | 701/120 |
| 5,483,241 A * | 1/1996 | Waineo et al. | 342/29 |
| 5,519,618 A * | 5/1996 | Kastner et al. | 701/120 |
| 5,530,440 A * | 6/1996 | Danzer et al. | 340/933 |
| 5,629,691 A * | 5/1997 | Jain | 340/961 |
| 5,659,319 A * | 8/1997 | Rost et al. | 342/36 |
| 5,670,962 A * | 9/1997 | Henderson et al. | 342/70 |
| 5,748,140 A * | 5/1998 | Schober | 342/90 |
| 5,831,570 A | 11/1998 | Ammar et al. | |
| 5,910,786 A * | 6/1999 | Watanabe | 342/70 |
| 6,219,594 B1 * | 4/2001 | Nicosia et al. | 342/33 |
| 6,278,965 B1 * | 8/2001 | Glass et al. | 701/120 |
| 6,307,473 B1 * | 10/2001 | Zampini et al. | 340/541 |
| 6,311,108 B1 | 10/2001 | Ammar et al. | |
| 6,462,697 B1 * | 10/2002 | Klamer et al. | 342/36 |
| 6,850,185 B1 | 2/2005 | Woodell | |
| 7,345,620 B2 * | 3/2008 | Voigtlaender et al. | 342/82 |
| 7,379,014 B1 | 5/2008 | Woodell et al. | |
| 7,379,165 B2 | 5/2008 | Anderson et al. | |
| 7,460,057 B2 * | 12/2008 | Fehrenbach et al. | 342/82 |
| 2002/0004692 A1 | 1/2002 | Nicosia et al. | |
| 2005/0104766 A1 * | 5/2005 | Bandhauer | 342/91 |
| 2008/0172178 A1 | 7/2008 | Anderson et al. | |

OTHER PUBLICATIONS

Lynda J. Kramer et al., Flight Testing an Integrated Synthetic Vision System; 12 Pages, Proc. of SPIE vol. 5802, NASA Langley Research Center, Mar. 28, 2005.

* cited by examiner

GROUND COLLISION INSTRUMENT FOR AIRCRAFT AND MARINE VEHICLES

PRIORITY CLAIM

This patent application claims priority from U.S. Provisional Patent Application Ser. No. 61/024,495 filed Jan. 29, 2008, and entitled, "Ground Collision Instrument for Aircraft and Marine Vehicles," the contents of which are hereby incorporated by reference in its entirety.

BACKGROUND OF THE INVENTION

Vehicles, in particular aircraft and marine vehicles, suffer the risk of collision with other vehicles, aircraft, trains, terminal structures, construction equipment and other obstacles on the ground and especially on runways where aircraft are concerned. Weather radar is often turned off on the ground because of the relative high power of the transmitter operating in the X-band or higher and because of the ground clutter return.

Figure 1:
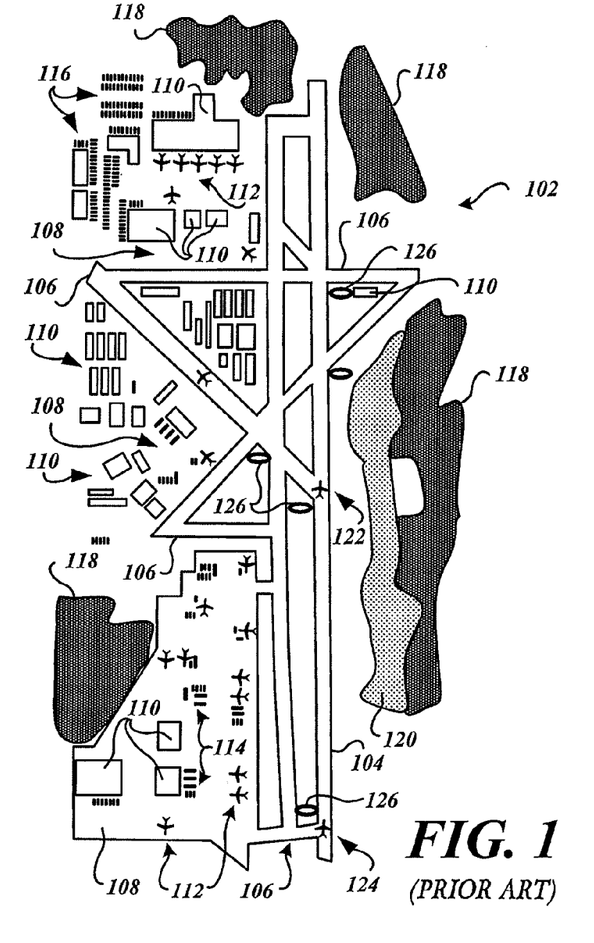
FIG. 1 is a plan view of a hypothetical airport.

FIG. 1 is a plan view of a hypothetical airport 102. The hypothetical airport 102 includes a runway 104, several taxiways 106, a plurality of tarmac areas 108, and a plurality of terminal buildings 110. A plurality of parked aircraft 112 are illustrated in various locations about the airport 102. A plurality of service vehicles 114, such as fuel trucks, luggage carts, construction equipment, and emergency vehicles, are located on the taxiways 106 and the tarmac 108. A plurality of parked automobiles 116 are parked in parking areas about the various buildings 110. Around the airport 102 are a plurality of forested areas 118, with relatively tall trees, and a brush area 120, with moderately high brush that is less than the height of the trees of the forested areas 118.

Further, an aircraft 122 is on the runway 104. The aircraft 122 may be stationary or moving, depending upon the situation. An aircraft 124 is at the end of the runway 104. The aircraft 122 will be causing a radar return that is received by the radar system of the aircraft 124.

Also, various sizes and types of signs 126 are positioned along the edges of the runway 104 and/or the taxiways 106 to provide guidance to the aircraft 122, 124. These signs 126 cause radar returns which further clutter the display of the radar information. Often, many signs 126 are on the runway 104 and/or the taxiways 106, of which only a few are conceptually illustrated. Further, there may be other structures, such as lights or the like (not shown) which also cause radar returns that also clutter the display.

Figure 2:
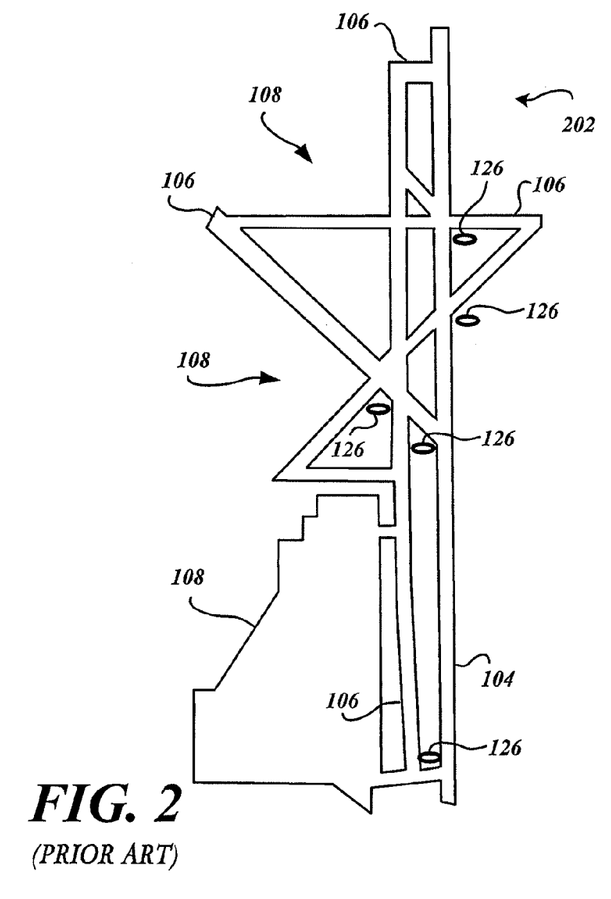
FIG. 2 is a conceptual diagram of a mapping of the hypothetical airport of FIG. 1 derived from a map database.

FIG. 2 is a prior art conceptual diagram of a mapping 202 of the hypothetical airport 102 of FIG. 1. The map of the airport 102 is derived from information residing in a map database. The mapping information includes information identifying geographic location of the various features of the airport 102, such as the boundaries of the runway 104, the taxiways 106, the tarmac areas 108 and the buildings 110. For example, the boundaries of the runway 104 may be defined as a polygon or the like where the corner locations are identified by geographic coordinates. Other objects, such as the signs 126, may also be identified by location in the mapping information.

Figure 3:
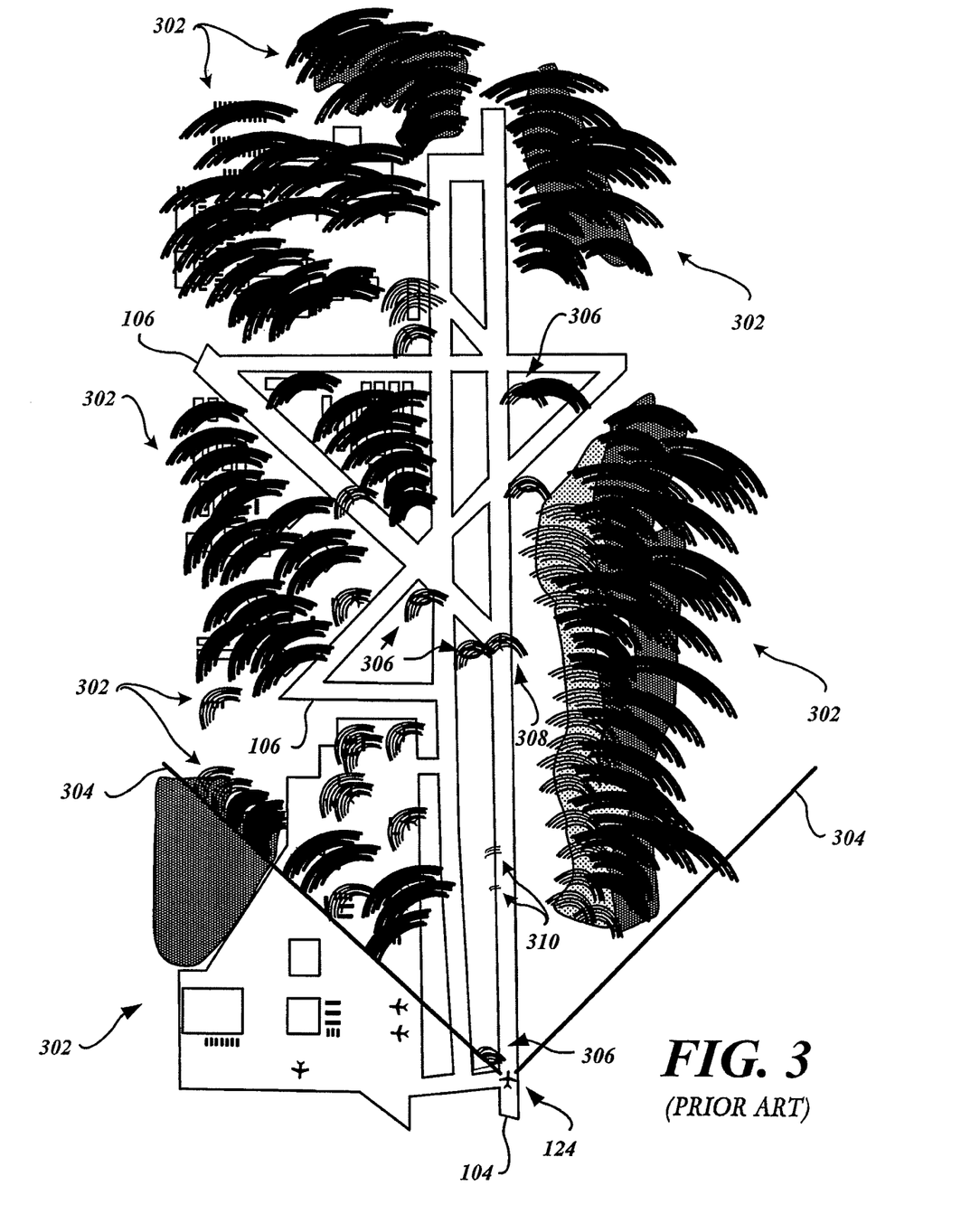
FIG. 3 is a hypothetical plan view of radar returns superimposed over the hypothetical airport of FIG. 1.

FIG. 3 is a hypothetical plan view of radar returns 302 generated by the radar system of the aircraft 124. The radar returns 302 are superimposed over the hypothetical airport 102 of FIG. 1 to illustrate the relative location of the airport 102 when the aircraft 124 is at the end of the runway 104. The radar sweep range of ninety degrees (90°), conceptually illustrated by the lines 304, shows large areas of radar returns 302 from the buildings 110, the parked aircraft 112, and the service vehicles 114. Further, large areas of radar returns 302 are illustrated for the forested areas 118, with relatively tall trees, and the brush area 120, with moderately high brush. A plurality of radar returns 306 are illustrated from the signs 126 along the runway 104. A radar return 308 is illustrated from the aircraft 122. Smaller radar returns 310 are illustrated, and may likely be reflections from very small objects such as lights or even debris.

It is appreciated that the illustrated radar return information, typically presented as radar returns only (without being superimposed on a map of the airport 102) does not present much useful information to the crew of the aircraft 124. In reality, the most relevant piece of information to the crew of the aircraft 124 is the presence of the aircraft 122 on the runway 104 (which may constitute a potential hazard to the aircraft 124). In such situations, the radar returns 302 displayed on a radar display include so much information, most of which is not relevant to the crew of the aircraft 124, that the crew is not likely to use the presented radar information while on the ground. Often, the radar system of the aircraft 124 is turned off.

Accordingly, a radar system is needed that can be taken anywhere in the world with vehicles, such as an aircraft or a marine vessel, which provides radar return information that does not display non-relevant radar information of the airport or other environment infrastructures.

SUMMARY OF THE INVENTION

Systems and methods of processing radar returns from a radar system are disclosed. An exemplary embodiment reduces energy of an output pulse emitted from a radar system; receives a plurality of radar returns from a plurality of objects that reflect the reduced energy output pulses emitted from the radar system; determines a surface area of interest based upon at least a current location of the installation vehicle; and filters the radar returns generated by objects that are located outside of the surface area of interest. Optionally, some systems and methods may reduce a sweep range of an antenna from which the reduced energy output pulses are emitted.

BRIEF DESCRIPTION OF THE DRAWINGS

Preferred and alternative embodiments are described in detail below with reference to the following drawings.

DETAILED DESCRIPTION OF THE INVENTION

Figure 4:
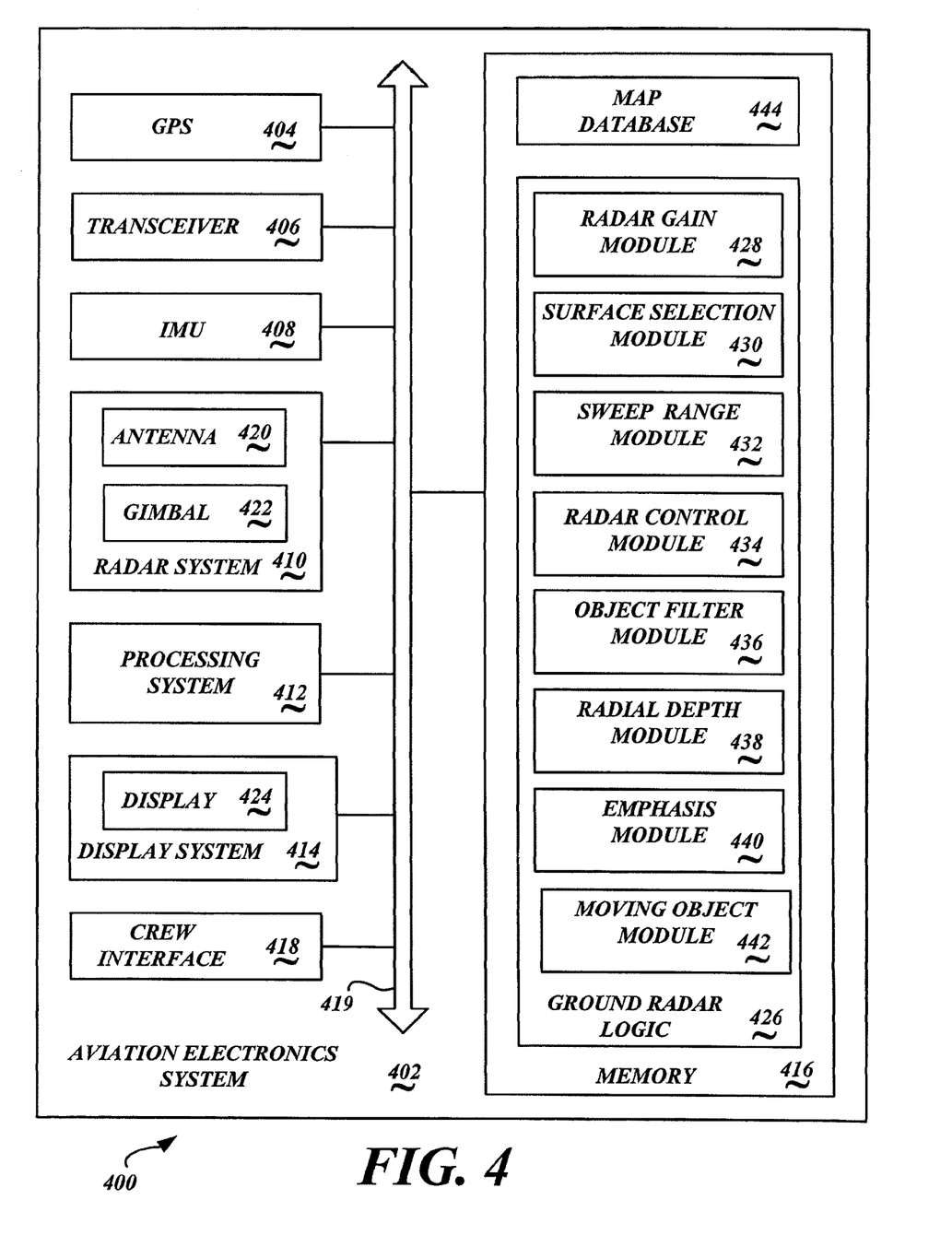
FIG. 4 is a block diagram of an embodiment of a ground radar system implemented in an aviation electronics system of an installation vehicle.

FIG. 4 is a block diagram of an exemplary embodiment of a ground radar system 400 implemented in an aviation electronics system 402 of an installation vehicle. Embodiments of the ground radar system 400 process radar information when an installation vehicle, such as an aircraft, is operating on the ground. Other embodiments are suitable for a marine radar, and process radar information when the installation vehicle, such as a ship, is operating in a port or around docks.

The aviation electronics system 402 includes a global positioning system (GPS) 404, a transceiver 406, an inertial measurement unit (IMU) 408, a radar system 410, a processing system 412, and a display system 414, a memory 416, and a crew interface 418. It is appreciated that the installation vehicle's aviation electronics system 402 includes many other components and/or systems that are not illustrated or described herein.

The above-described components, in an exemplary embodiment, are communicatively coupled together via communication bus 419. In alternative embodiments of the aviation electronics system 402, the above-described components may be communicatively coupled to each other in a different manner. For example, one or more of the above-described components may be directly coupled to the processing system 412, or may be coupled to the processing system 412 via intermediary components (not shown).

The radar system 410 may be any suitable radar system, such as, but not limited to, a weather radar that is operable to detect weather that is located relatively far away from the installation vehicle. The radar system 410 includes an antenna 420 and an optional gimbal 422. The antenna 420 is operable to emit radar pulses and to receive radar returns. A radar return is reflected energy from an object upon which the emitted radar pulse is incident on. The gimbal 422 is operable to sweep the antenna 420 in a back-and-forth motion, and in other directions of interest, such that the radar system 410 is able to detect objects in an area of interest about the installation vehicle, such as an aircraft. Embodiments may be implemented in other types and/or applications of radar, such as marine radar.

The ground radar system 400 is operable to modify operation of the radar system 410 by reducing the energy (output power) of the emitted output radar pulses from the radar antenna 420. Additionally, or alternatively, the ground radar system 400 is operable to reduce the sweep range of the antenna 420 by controlling motors of the gimbal 422 that controls the sweeping motion of the antenna 420. Thus, the effective detection range of the radar system 410 is controllable, such as down to a mile or two in range to correspond to at least the length of the runway 104. And, the reduced sweeping range of the antenna 420 results in a narrower region of radar returns that are directly in front of the installation vehicle (or in another direction of interest with respect to the installation vehicle). The resulting radar return, after processing and filtering described herein, is communicated to the display system 414 such that the processed radar returns are presented on a display 424 to the crew of the installation vehicle.

Embodiments of the ground radar system 400 may be implemented as software and/or firmware. An exemplary embodiment of the ground radar system 400 includes a computer-based or processor-based executable code, designated as the ground radar logic 426. An exemplary embodiment of the ground radar logic 426 comprises an optional surface selection module 430, an optional sweep range module 432, an optional radar control module 434, an object filter module 436, an optional radial depth module 438, an optional emphasis module 440, and/or an optional moving object filter 442. The ground radar logic 426, residing in the memory 416, is retrieved and executed by the processing system 412 when the installation vehicle, such as an aircraft, is on the ground at the airport 102 (or when the installation vehicle is a ship travelling through a port or near docks).

The optional radar control module 434 determines instructions for controlling the radar system 410. In an exemplary embodiment, the radar control module 434 reduces the output energy of the emitted radar pulses from the radar antenna 420. The typical output power of the radar system 410 when detecting weather conditions, such as when the installation vehicle is an in-flight aircraft, may range from thirty to forty watts (though some systems may operate at higher or lower output wattage). The radar control module 434 reduces the output energy to a significantly lower energy such that the effective detection range of the radar system 410 is reduced to a distance that corresponds to the length of the runway 104 or to some other predefined length. An exemplary embodiment reduces the output energy to several milli-watts. Thus, an exemplary embodiment of the ground radar system 400 modifies operation of the radar system 410 down to one or two miles. The effective detection range of the radar system 410 may be reduced to a predefined distance (by reducing the output power to a predefined value). Alternatively, or additionally, the effective detection range of the radar system 410 may be dynamically reduced to a distance of interest (by reducing the output energy to a reduced value based a criteria of interest, such as, but not limited to, the known length of the runway 104).

A map database 444 stored in memory 416 includes geographic information for at least the current airport that the installation aircraft is navigating over while on the ground. In marine applications, the map database may include mapping information for ports or docks. Thus, the surface area of interest could be a small area of the port where the ship is docking.

In the airport example when the installation vehicle is an aircraft, the map database 444 contains mapping information for various features of the airport 102, such as the runway 104, the taxiways 106, the tarmac areas 108, and the terminal buildings 110 (FIG. 1). Information for many different airports may reside in the map database 444. In some embodiments, mapping information for the airport 102 may be communicated to the installation vehicle via its transceiver 406.

In some embodiments, data may be manually added into the map database 444 via the crew interface 418. For example, a crewmember of the installation vehicle may enter the location of an object (not already included in the map database 444), such as, but not limited to a sign, a light, or a construction area, as the installation vehicle is traversing the runway 104. Thus, upon return to the airport 102, the mapped object is included in the map database 444. The information for mapping the object may be manually entered using any suitable means, such as a key board, key pad or the like. In some embodiments, a touch sensitive screen may be used to enter the mapping information for the object. For example, the object may be generating a radar return. The crew may indicate that mapping information is to be created, and then simply touch the area of the display where the radar return for the object is being presented. Based upon known location of the runway 104, the taxiways 106, or the tarmac areas 108, and the known real time location of the aircraft, the geographic location of the object is determined and saved into the map database 444.

The optional surface selection module 430, based upon a prior knowledge of the airport 102 (i.e.; knowledge of which airport the installation aircraft or the port that the installation ship is currently at), accesses the mapping information in the map database 444 for the airport 102 (or port). For convenience, operation of embodiments of the ground radar system 400 are described in terms of an aircraft operating on the ground on a runway or other surface of the airport 102. It is appreciated that the ground radar system 400 may equally refer to an installation ship traversing a port, such as when arriving or departing from its dock. Here, the "ground" is construed as the surface of the water that the installation ship is traversing.

The GPS 404 and/or the IMU 408 provide location and heading information to the processing system 412 so that the current (real time) geographic location of the installation vehicle is determined. Based upon the determined location and heading of the installation vehicle, the surface selection module 430 identifies a surface area of interest. Preferably, the surface area of interest is immediately ahead of the installation vehicle. In the example of an installation aircraft, the surface area of interest may be the runway 104, the taxiways 106, or the tarmac areas 108 that the installation aircraft is currently travelling on. Accordingly, based upon a determined current geographic location and a current heading of the installation aircraft, the surface area of interest corresponds to a projected path of the installation aircraft. In a marine application, the surface selection module 430 may be referred to as a port or dock selection module such that a port and/or a dock of interest is selected.

The determined surface area of interest is then used to filter out radar return information provided from the radar system 410 (now operating at the reduced power output since the installation aircraft is on the ground, or since the installation ship is in the port and/or near the docks). That is, radar return information falling outside of the surface area of interest is filtered (deleted, discarded or otherwise ignored) and not presented on the display 424. The radar return information falling within the surface area of interest is then processed by other modules of the ground radar logic 426.

The optional sweep range module 432 is operable to adjust the range of the side-to-side movement of the antenna 420. In an exemplary embodiment, the sweep range may be reduced from the sweep range used for detecting weather, such as from a full circle or from 90° (see, for example, FIG. 1), to a reduced sweep range of ten degrees (10°) about the installation vehicle's current heading (or another heading of interest). In some embodiments, the rate of the antenna sweep (that is, how fast the antenna 420 is moved) may be adjusted.

As noted above, the sweep range module 432 may be optional. For example, the surface selection module 430 may select for processing only the radar return information that corresponds to the surface area of interest. In another embodiment, the radar returns from the original range of sweep is received, but the incoming radar return information is filtered into a virtual reduced sweep range such that only radar return information corresponding to a predefined reduced sweep range is provided by the radar system 410 and/or is processed by the ground radar system 400.

The optional radar control module 434 is operable to generate control instructions to the radar system 410. For example, the radar control module 434 generates the commands that reduce the output power of the emitted radar pulses from the radar antenna 420 and/or that reduce the sweep range of the antenna 420 by controlling motors of the gimbal 422.

Figure 5:
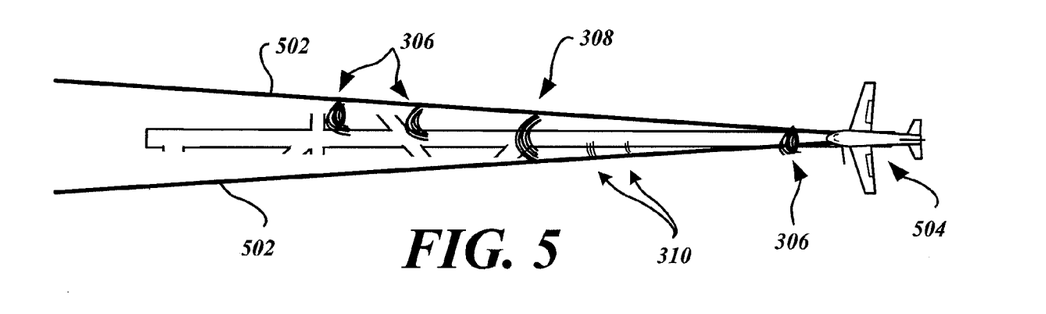
FIG. 5 conceptually illustrates the effect of a sweep range module and a surface selection module on radar return information.

FIG. 5 conceptually illustrates the effect of the sweep range module 432 and the surface selection module 430 on radar return information provided by the radar system 410 in an installation vehicle. An exemplary embodiment presents a radar return display 500 with the narrowed radar sweep range of approximately ten degrees (10°), conceptually illustrated by the lines 502, on the display 424. In some embodiments, a map of the surface area of interest, here the runway 104, is also presented on the display 424 so that the crew of the installation aircraft has an appreciation of relative location of the radar returns 306, 308, 310. An optional icon 504 is also presented on the display to indicate the relative location and heading of the installation aircraft with respect to the runway 104.

In this hypothetical example, the radar return display 500 does not show the large areas of radar returns 302 from the buildings 110, the parked aircraft 112, and the service vehicles 114 (FIG. 3). Thus, a considerable amount of distracting information that would otherwise be presented to the crew of the installation aircraft has been omitted on the radar return display 500. That is, a significant amount of radar image clutter has been removed by the sweep range module 432 and/or the surface selection module 430. Some embodiments of the ground radar system 400 are operable to present this reduced amount of information on the display 424. It is appreciated that various alternative embodiments may use one of, or both of, the sweep range module 432 and the surface selection module 430.

However, the radar return display 500 still presents clutter that may be distracting to the crew of the installation aircraft. For example, the signs 126 located along the runway 104 generate a discernable amount of radar return information 306 that is displayed on the radar return display 500. Other reflections from small signs, lights, or other objects located along the runway 104, also generate a discernable amount of radar return information 310 that is displayed on the radar return display 500. The aircraft 122 in the middle of the runway 104 also generates radar return information 308. However, it may be difficult for the crew of the installation aircraft to discern the radar return information 308 generated by the aircraft 122 from the cluttering radar return information 306, 310.

Mapping information stored in the map database 444 for some airports may additionally include geographic location and object identification information for objects that may generate radar returns. For example, but not limited to, one or more of the signs 126 may be identified by geographic location in the mapping information. Embodiments of the ground radar system 400 compare the received radar information to identify the relative location of the remaining radar returns (that have not otherwise been filtered out by the sweep range module 432 and the surface selection module 430). The determined location of such radar returns are compared with the location of the other objects identified in the mapping data. When the location of a radar return correlates with the known location of an object, the object filter module 436 filters (discards, removes, or otherwise deletes) the radar return information whose location correlates with the known location of an object.

Some embodiments are configured to compare one or more characteristics of a radar return having a location corresponding to the known location of the object to ascertain the probability that the radar return was generated by the object. For example, if the object is one of the signs 126 along the runway 104, it could be expected that the radar return from the sign 126 would have a consistent, identifiable characteristic. If the characteristics of the received radar return correspond to the expected characteristics of the radar return from the sign 126, within some relevant statistical-based threshold, the object filter module 436 may conclude with reasonable certainty that the received radar return was generated by the sign 126 (and therefore filters that radar return information). On the other hand, if the characteristics of the received radar return is larger and/or stronger than the expected radar return from the sign 126, the object filter module 436 may conclude with reasonable certainty that the received radar return was not generated by the sign 126, but rather, was generated by a different object (such as another aircraft or service vehicle). Thus, the radar return information would be presented on the radar display 424.

Some radar returns reflect a significant amount of energy from their surface, but because of their small size, normal to the installation vehicle, generate a relatively weak return. For example, the radar returns 508 are generated from relatively small objects (not included in the airport mapping data residing in the map database 444, and thus, not removed by the object filter module 436). Such returns may be characterized by a small radial depth. That is, the radar return information is not very deep (as compared to a relatively large object such as a building or aircraft).

The optional radial depth module 438 correlates remaining radial depth of those radar returns with known radial depths of a small objects that would not likely be of interest to the crew of the installation vehicle. The radial depth module 438 filters the radar return information whose radial depth correlates with a radial depth of small objects. Some embodiments are configured to graphically compare the radial depth of the radar return with the known radial depths of small objects that are not of interest to the crew to ascertain the probability that the radar return was generated by an object that is not likely to be of interest to the crew. Other embodiments are configured to compare one or more characteristics of the energy of the radar return to ascertain the depth of the radar return.

If the object is a small light along the runway 104, it could be expected that the radial depth of the radar return, for example one of the radar returns 310, from the small light would be a relatively small and/or weak. Accordingly, the radial depth module 438 may conclude with reasonable certainty that the received radar return 310 was generated by the small object (and therefore filters that radar return information). On the other hand, if the radial depth of the received radar return 310 is larger and/or stronger than the expected radial depth of a radar return from a small object, the radial depth module 438 may conclude with reasonable certainty that the received radar return was not generated by the small object, but rather, was generated by a larger object (such as another building, aircraft, or service vehicle). Thus, the radar return information would be presented on the radar display 424.

Some embodiments are configured to also consider the relative location of the radar return with the depth of the radar return. For example, if the radar return with a small radial depth is on the side of the runway 104, the radial depth module 438 may determine that the radar return was generated by an object that is not likely to be of interest to the crew. On the other hand, if the radar return with a small radial depth is on the center of the runway 104, such as a radar return that would be generated by a piece of debris, the radial depth module 438 may determine that the radar return is likely to be of interest to the crew.

Figure 6:
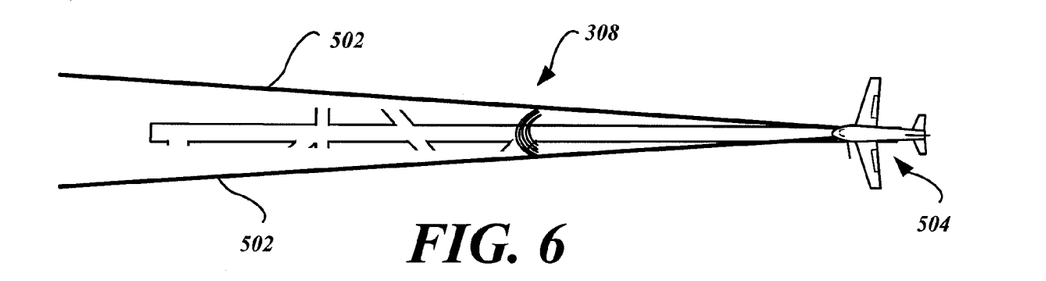
FIG. 6 conceptually illustrates the effect of an object filter module and a radial depth module on radar return information provided by the radar system in an installation vehicle.

FIG. 6 conceptually illustrates the effect of the object filter module 436 and the radial depth module 438 on radar return information provided by the radar system 410 in an installation vehicle. An exemplary embodiment presents a radar return display 600 with the radar return information identified as being associated with a known object (by the object filter module 436) being removed, such as the exemplary radar returns 306 from the signs 126. Also, radar return information identified as being associated with a small objects (by the radial depth module 438) being removed, such as the exemplary radar returns 310.

After the above-described filtering, it is appreciated that the radar return information generated by the aircraft 122 remains and is presented on the display 424, as illustrated in FIG. 6. The radar return 308 generated by the aircraft 122 was not filtered out by the sweep range module 432 or the surface selection module 430 since the aircraft 122 is within the surface area of interest (the runway 104). The radar return 308 was not filtered out by the object filter module 436 since there are no objects in the airport mapping data corresponding to the location of the aircraft 122. Further, the radar return 308 was not filtered out by the radial depth module 438 since the depth of the radar return generated by the aircraft 122 is relatively large or deep. Accordingly, the radar return 308 generated by the aircraft 122 is retained, and when presented on the display 424, is radar return 308 is presented without the undesirable clutter that is otherwise distracting and not relevant to the crew of the installation vehicle.

In some embodiments, the optional emphasis module 440 is configured to modify the presentation of the radar return information for objects remaining after filtering by the sweep range module 432, the surface selection module 430, the object filter module 436, and the radial depth module 438. One embodiment may enlarge the size of the radar return information. Additionally, or alternatively, the radar return information may be presented in a color that may be associated with a hazard level (red or yellow, for example), and/or may be presented with an increased intensity. Another embodiment may substitute a noticeable icon or the like for the radar return information. In some embodiments, a visual or an audible warning (or alarm) may be presented.

The optional moving object module 442 is configured to monitor changes in radar returns which may indicate movement of an object. If an object generating radar returns is moving, the moving object module 442 retains the radar returns, which may otherwise be removed by one or more of the other filters, and presents the radar return for the moving object. The moving object module 442 may optionally cooperate with other modules. For example, returns associated with moving objects that are outside of the surface area of interest may be filtered. As another non-limiting example, the radar return for the detected moving object may be emphasized by the emphasis module 440.

For example, a first radar return associated with an object located within the surface area of interest may be compared with a second radar return associated with the object, the second radar return received at a later time. The moving object module 442 determines if the object is moving based upon a difference between the first radar return and the second radar return. The radar return is retained for presentation on the display 424 in response to determining that the object is moving.

Figure 7:
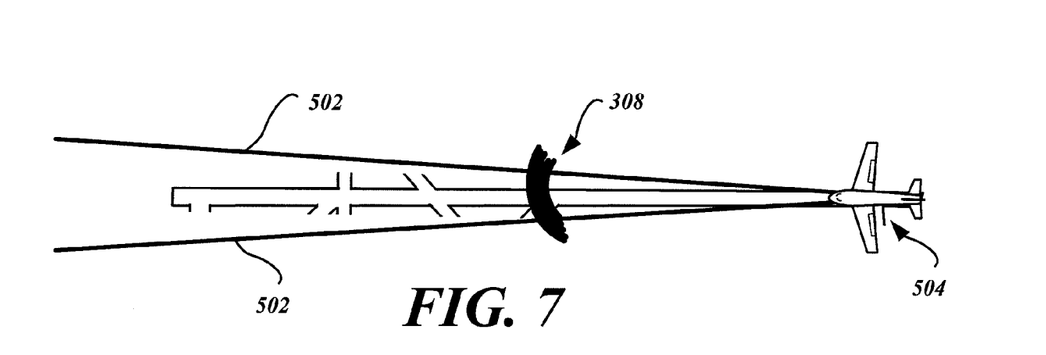
FIG. 7 conceptually illustrates an exemplary presentation of radar returns generated by an embodiment of an emphasis module.

FIG. 7 conceptually illustrates an exemplary presentation of radar returns generated by an exemplary embodiment of the emphasis module 440. Here, the radar return information generated by the aircraft 122 that is on the runway 104 (the surface area of interest) has been enlarged and is presented at a higher intensity so as to be more discernable to the crew of the installation vehicle.

It is appreciated that the above-described modules 428, 430, 432, 434, 436, 438, 440, 442 of the ground radar logic 422 were described and illustrated as separate modules for the clarity of describing an exemplary embodiment of the ground radar system 400. In alternative embodiments, the modules 428, 430, 432, 434, 436, 438, 440, 442 may be integrated together in different manners, some modules may be implemented as a plurality of smaller modules, some modules may be omitted, and other modules not described herein may be included.

As noted above, other aircraft and vehicles on runways or marine traffic lanes can be shown on a display using information produced by a low power weather radar that is activated when the aircraft/vehicle, for example, is on or near a runway/traffic lane. Examples of such weather radars are Honeywell RDR-4000, Rockwell Collins, Inc. WXR-2100 multi-scan radar, and others. The above-described anti-clutter processors may be used to improve the information sent by the low power weather radar.

The runway surface has a low incident angle relative to the aircraft's weather radar, and therefore, little reflectivity of the runway occurs. Thus, the runway 104 would be displayed as dark. Another aircraft, vehicle, construction equipment or obstacles on the runway 104, after filtering by the modules 428, 430, 432, 434, 436, 438, 440, 442 will provide reflectivity, and thus, they may be shown as an icon or other identifier (e.g., text) on the weather radar display.

Alternative embodiments allow marine vessels or aircraft to detect other ships in shipping lanes or aircraft on runways independent of the airport infrastructure and environment anywhere in the world. For example, no airport mapping information may be available in the map database 444.

GPS (Global Positioning Systems) and/or runway/shipping lane data (and other information—e.g., discrete sensor inputs, such as weight-on-wheels switch, a weight-off-wheels signal, hydraulic system signal, fuel pump signal, oil pressure signal, a (parking) brake system signal, a door (open or closed) signal, engine N2 or speed signal, a ground speed signal, an air speed signal, a flight information signal, an aircraft heading signal, a time, taxi lights signals, external signals received over RF, etc.) are used by the processing system 412 to activate the weather radar when the aircraft is on the ground, when the marine vessel is in a shipping lane, or when some other pre-determined condition occurs, depending on the type of vehicle.

In some embodiments, as noted herein, the weather radar system 410 is instructed to operate at an acceptably low power level (e.g., 0-5 dBm) with a sharpened pulse width (e.g., 20-50 nanoseconds) to improve the definition of reflected returns from objects on the runway, shipping lane, or other environment. By using the aircraft position information from GPS (or other positioning system) and runway database information stored in WGS-84 coordinates, the processor generates a "virtual box" around the runway (similar to but not the same as RAAS (Runway Awareness Advisory System), which provides improved situational awareness to help lower the probability of runway incursions by providing timely aural advisories to the flight crew during taxi, takeoff, final approach, landing and rollout). The virtual box is used to minimize or eliminate clutter outside the box and to show radar reflected "targets" on the runways. The beam angle of the weather radar scans a wide angle (80 degrees or so). Doppler can also be used to display and provide aural and visual advisories for aircraft simultaneously taking off on converging runways.

Figure 8:
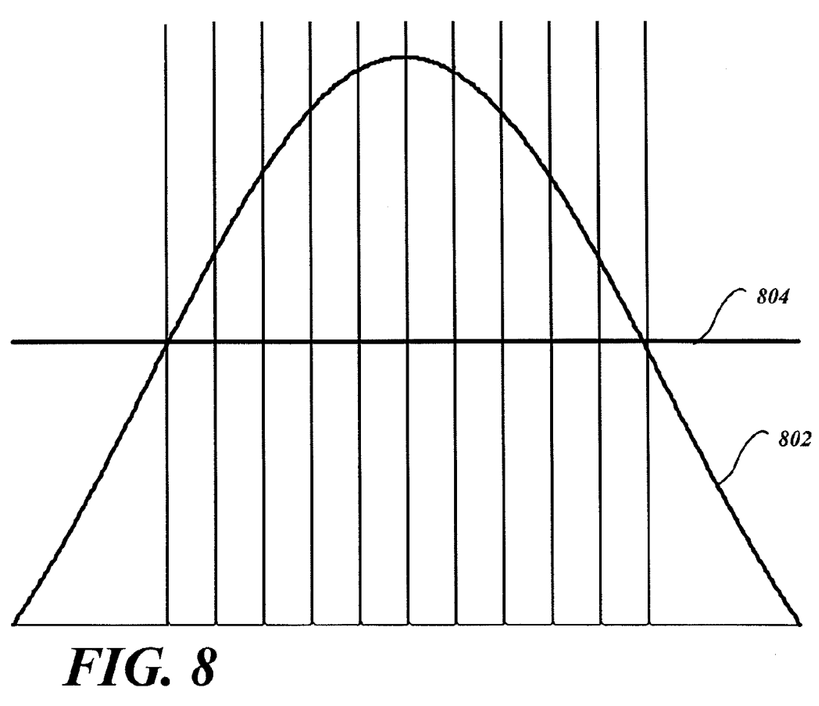
FIG. 8 is a plot of a Sin X/X antenna pattern which is typical of an X-Band weather radar antenna.

As shown in FIG. 8, the curved line 802 is a plot of a Sin X/X antenna pattern which is typical of an X Band weather radar antenna. The horizontal line 804 shows the position of the −3 dB points which defines the antenna's beam width. For a three degree (3°) beam width at a distance of 10,000 feet, these −3 dB points are 52.3 feet apart. The centroid (peak of the antenna pattern) is 1.995 times higher (3 dB) than the edges of the beam. It is known that the antenna centroid is dead ahead of the aircraft and if the antenna is swept across a distant object, one is able to detect the maximum signal returned. The angular difference between the antenna pointing angle for max signal and the antenna's dead ahead position will provide an accurate angular location of the distant object. Distance to the object along with the antenna angle is used to determine if the object is actually on the runway or not. The radar returns, based upon the curve 802, may be used by the radial depth module 438 to identify small objects for with their radar returns should be filtered.

The typical X Band radar beam width is in the order of +/−3°. For a typical 300 foot wide runway, 3° is about 5,700 feet down the runway. Runway return is typically very low in contrast to reflectivity from objects off the runway, Objects on the runway can be detected and differentiated from side-lobe clutter and objects off the runway at much greater range. The ability of the RDR-4000 radar antenna, for example, is utilized to precisely scan small angles, e.g., +/−5° each side of the runway heading that is stored in a database, and other parameters to differentiate real conflicts on a runway.

Figure 9:
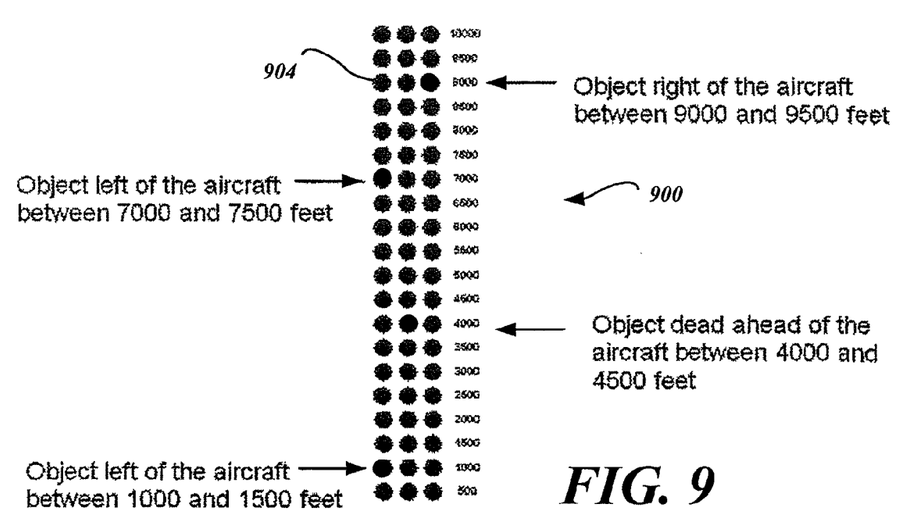
FIG. 9 is a diagram of an exemplary LED display embodiment.

FIG. 9 shows a very simple but effective displayed image which indicates the location of objects detected generated by an alternative embodiment of the ground radar system 400. This display 902 uses a pattern of light emitting diodes (LEDs) 904 to indicate the relative distance to an object and the object's relative alignment of the object with the installation vehicle. This LED-based display 902 may be presented on any pre-existing cockpit display that has a pattern of LEDs 904, or may be implemented as a separate LED display 902. Further, the LED display 902 may be implemented on an electronic flight bag.

In some embodiments, the surface area of interest and or the output power of the antenna 420 may be adjusted based upon the current ground speed of the installation vehicle. For example, if the installation vehicle is travelling faster, the size of the surface area of interest (length and/or width) may be increased so that more pertinent information is presented to the crew. Similarly, if the installation vehicle is travelling faster, the output power from the antenna 420 may be increased so as to increase the effective detection distance.

The memory 416 may be any suitable memory device or system. Depending upon the embodiment, the memory 416 may be a dedicated memory system, may be part of another component or system, and/or may be a distributed memory system. The memory 416 may also include other logic not illustrated or described herein.

When the ground radar logic 426 is implemented as software and stored in the memory 416, one skilled in the art will appreciate that the ground radar logic 426 can be stored on any computer-readable medium for use by or in connection with any computer and/or processor related system or method. In the context of this disclosure, the memory 416 is a computer-readable medium that is an electronic, magnetic, optical, or other another physical device or means that contains or stores a computer and/or processor program. The ground radar logic 426 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with the ground radar logic 426. In the context of this disclosure, a "computer-readable medium" can be any means that can store, communicate, propagate, or transport the program associated with the ground radar logic 426 for use by or in connection with the instruction execution system, apparatus, and/or device. The computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with the ground radar logic 426 is printed, as the program can be electronically captured, via for instance optical scanning of the paper or other medium, then compiled, interpreted, or otherwise processed in a suitable manner, if necessary, and then stored in the memory 416.

The above exemplary example of the ground radar system 400 was described in the context of an aircraft operating on the ground. Alternative embodiments are adapted for marine application where the installation vehicle is a ship or boat.

While the preferred embodiment of the invention has been illustrated and described, as noted above, many changes can be made without departing from the spirit and scope of the invention. For example, other radar values outside those presented may be used. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for processing radar information when an installation vehicle is operating in proximity to a surface area of interest, the method comprising:
   reducing energy of an output pulse emitted from a radar system;
   receiving a plurality of radar returns from a plurality of objects that reflect the reduced energy output pulses emitted from the radar system;
   determining the surface area of interest based upon at least a current location of the installation vehicle; and
   filtering the radar returns generated by objects that are located outside of the surface area of interest.

2. The method of claim 1, wherein filtering the radar returns comprises:
   determining a current location and a current heading of the installation vehicle; and
   identifying, for each of the plurality of radar returns, a geographic location of each radar return based upon the determined location of the installation vehicle.

3. The method of claim 1, further comprising:
   reducing a sweep range of an antenna from which the reduced energy output pulses are emitted.

4. The method of claim 1, wherein filtering the radar returns comprises:
   defining a virtual reduced sweep range; and
   identifying, for each of the plurality of radar returns, a geographic location of each radar return based upon the virtual reduced sweep range.

5. The method of claim 1, further comprising:
   determining a current geographic location and a current heading of the installation vehicle such that the surface area of interest corresponds to a projected path of travel of the installation vehicle.

6. The method of claim 1, wherein filtering the radar returns comprises:
   retrieving geographic location information for an object located within the surface area of interest;
   identifying a radar return associated with the object; and
   filtering the radar return associated with the object.

7. The method of claim 1, wherein filtering the radar returns comprises:
   determining a depth of a radar return associated with an object located within the surface area of interest; and
   filtering the radar return associated with the object located within the surface area of interest in response to the depth being less that a predefined depth threshold.

8. The method of claim 1, wherein filtering the radar returns comprises:
   comparing a first radar return associated with an object located within the surface area of interest with a second radar return associated with the object, the second radar return received at a later time;
   determining if the object is moving based upon a difference between the first radar return and the second radar return; and
   retaining the radar return for presentation on a display in response to determining that the object is moving.

9. The method of claim 1, wherein filtering the radar returns comprises:
   filtering from a plurality of radar returns associated with a plurality of objects located within the surface area of interest a first plurality of radar returns, wherein at least one second radar return remains; and
   generating information corresponding to a second radar return for presentation on a display, wherein the displayed information is emphasized.

10. The method of claim 1, wherein determining the surface area of interest comprises:
    determining a current airport that the installation vehicle is traversing while on the ground;
    retrieving from a map database mapping information corresponding to the determined current airport;
    determining a current location and a current heading of the installation vehicle; and
    comparing the current location and the current heading of the installation vehicle with a plurality of predefined surfaces of the current airport,
    wherein the surface area of interest corresponds to one of the plurality of predefined surfaces of the current airport that the installation vehicle is traversing.

11. The method of claim 1, wherein determining the surface area of interest comprises:
    determining a current port that the installation vehicle is traversing over water;
    retrieving from a map database mapping information corresponding to the determined current port; and
    determining a current location and a current heading of the installation vehicle;

comparing the current location and the current heading of the installation vehicle with a plurality of predefined surfaces of the current port, wherein the surface area of interest corresponds to one of the plurality of predefined surfaces of the current port that the installation vehicle is traversing.

12. A radar system, comprising:

a radar system that is operable to detect weather that is located relatively far away from an installation vehicle;

a processing system communicatively coupled to the radar system and operable to process radar returns detected by the radar system, the radar returns corresponding to reflections from objects in the vicinity of the installation vehicle;

a memory communicatively coupled to the processing system and operable to store a map database defining a plurality of surface areas of interest;

a radar gain module residing in the memory and operable to cause the radar system to reduce energy of a plurality of output pulses emitted from the radar system;

at least one of a global positioning system (GPS) and an inertial measurement unit (IMU) communicatively coupled to the processing system and operable to provide location information and heading information to the processing system; and a display system with a display communicatively coupled to the processing system and operable to information corresponding to the received radar returns, wherein the processing system is further operable to:
  determine a current location and a current heading of the installation vehicle;
  select a surface area of interest corresponding to a projected path of travel of the installation vehicle that is based upon the determined current location and the current heading of the installation vehicle;
  identify, for each of the plurality of radar returns, a geographic location of each radar return based upon the determined location of the installation vehicle; and
  filter the radar returns generated by objects that are located outside of the surface area of interest.

13. The radar system of claim 12, further comprising:

a radar gain module residing in the memory and operable to cause the radar system to reduce a sweep angle of an antenna concurrently with the reduction of the energy of the plurality of output pulses emitted from the radar system.

14. The radar system of claim 12, further comprising:

a sweep range module residing in the memory and operable to define a reduced sweep angle, wherein a plurality of radar returns that are located outside of the reduced sweep angle are filtered.

15. The radar system of claim 13, further comprising:

an object filter module residing in the memory and operable to cause the processing system to retrieve from the map database location information corresponding to at least one object located on the surface area of interest, wherein a radar return having a location that corresponds to the location of the object is filtered.

16. The radar system of claim 12, further comprising:

a radial depth module residing in the memory and operable to determine a depth of a radar return associated with an object located within the surface area of interest, wherein a radar return associated with the object located within the surface area of interest is filtered in response to the depth being less that a predefined depth threshold.

17. The radar system of claim 12, further comprising:

an emphasis module residing in the memory and operable to emphasize radar returns displayed on the display.

18. The radar system of claim 12, further comprising:

a moving object module residing in the memory and operable to determine from a plurality of radar returns whether an object is moving, and in response to determining that the object is moving, is operable to display radar returns from the moving object on the display.

19. A system that processes radar information when an installation vehicle is operating in proximity to a surface area of interest, the method comprising:

means for reducing energy of an output pulse emitted from a radar system;

means for receiving a plurality of radar returns from a plurality of objects that reflect the reduced energy output pulses emitted from the radar system;

means for determining the surface area of interest; and means for filtering the radar returns generated by objects that are located outside of the surface area of interest.

20. The system of claim 19, further comprising:

means for reducing a sweep range of an antenna from which the reduced energy output pulses are emitted.

* * * * *